Patented Dec. 20, 1932

1,891,878

UNITED STATES PATENT OFFICE

JOHN FELTER, OF HAVERSTRAW, NEW YORK

COATING COMPOSITION

No Drawing.  Application filed May 27, 1931. Serial No. 540,517.

This invention relates to compositions for covering floors, and the interior and exterior walls of buildings, and has in view the provision of a water-proof and fire-resistant composition.

Another object in view is the provision of a magnesia base composition which is resistant to aqueous detergents and which will not leach out when subjected to repeated applications of hot or cold water or cleansing solutions.

The composition consists of a mixture of finely divided cellulose material which has been pretreated to render it water-proof; powdered inert mineral material, such as talc, clay, silex, decomposed silica and sand; fibrous material, such as asbestos; calcined magnesite, and an aqueous solution of magnesium chloride. The aqueous solution of magnesium chloride reacts with the calcined magnesite to form solid magnesium oxychloride which renders the plastic mass a hard composition with the evaporation of the excess water content.

Unless the cellulose material is firmly bonded with the magnesium chloride, nascent hydrochloric acid is formed in the presence of hot or cold water or cleansing solutions which attacks the composition by dissolving the uncombined magnesium chloride content with the consequent formation of cracks or pits and causing the composition to lose its color. Furthermore, the cellulose material will absorb water permitting decomposition to set in.

The present invention overcomes this disintegrating action of the composition in the presence of hot or cold water and cleansing solutions, by impregnating the cellulose material with a water-proofing material which is non-reactive to a solution of magnesium chloride. The aforesaid impregnating material is volatile and free from dissolved solid bodies so that it will readily evaporate from the outside surface of the finely-divided cellulose material, leaving the said material in its natural condition to absorb and become coated with the magnesium chloride solution to render the same fire-proof and providing a bonding agent with the other ingredients in the compound to render the said compound a homogeneous mass.

A substance which possesses the desired property of rendering the finely-divided cellulose material impervious to water and which is non-reactant to magnesium chloride so that the cellulose material may be coated therewith, is liquid isomer mono-chlor-naphthalene. This substance will not support combustion, has ability to penetrate the inner fibers of the finely-divided cellulose material to render the same water-proof, and will quickly evaporate from the surface of the cellulose material to permit the finely-divided material to be coated with the magnesium chloride with a consequent bonding or keying-in of the said material in the composition. This prevents the cellulose material from becoming isolated in the composition and floating to the top when in plastic condition.

The said composition formed with magnesia as a base and chemically treated cellulose material may be used as an under coating for flooring, and as a finished coating of the same basic composition with the exception that less of the cellulose material is composed in the finished material. It may also be used for interior wall coatings and outside wall stucco coating, and when so used the cellulose content is substantially the same as the finished floor coating.

In preparing a base floor coating, approximately 18 per cent of cellulose material, such as sawdust, is first treated by spraying the same with distilled isomer mono-chlor-naphthalene, which is allowed to evaporate from the surface of the cellulose material and then mixed in a substantially dry state with approximately 40 per cent calcined magnesite, 2 per cent asbestos, approximately 40 per cent of powdered mineral filler, such as talc, clay, silex, decomposed silica, or sand. These ingredients are thoroughly mixed in a dry state and then reduced to a plastic composition by a solution of magnesium chloride to a consistency that may be troweled or spread in position. When the solution of magnesium chloride is added to the dry mixture, a chemical reaction takes place with the calcined magnesite, the resulting compound hardening upon the evaporation of the excess water content. The surface of the cellulose material being substantially in its natural state will absorb some of the magnesium chloride solution which by virtue of the corrosive properties thereof will cause a disintegrating action upon the sawdust to render the same fire-resisting and which will act as a coating agent to bond the cellulose material in the composition upon hardening.

In preparing the composition for a finished flooring, approximately 6 per cent of the finely-divided cellulose material is pretreated by spraying the same with distilled isomer mono-chlor-naphthalene which is allowed to evaporate from the surface of the cellulose material, and is then mixed with approximately 45 per cent of calcined magnesite; 2.5 per cent of asbestos; 34 per cent of talc, decomposed silica, clay, silex or sand, and 10 per cent of coloring material. The dry mixture is then made plastic by a solution of magnesium chloride, as hereinbefore described, which combines with the calcined magnesite to form a chemical compound which will harden on evaporation of the excess water.

Plastic and stucco composition for the walls of buildings are combined in the same way; the proportions used are approximately 6 per cent of the finely-divided cellulose material; 22 per cent of calcined magnesite; 4 per cent of asbestos, and 68 per cent of sand and silex. The stucco composition has a slightly larger sand and silex constituent, approximately 70 per cent, with slightly less magnesite, approximately 20 per cent. The cellulose material, such as sawdust or flour of sawdust, is pretreated, as hereinbefore described, which renders the same water-proof and fire-resistant.

Attention is directed to my prior applications, Serial Nos. 312,933, 312,934, 312,935 filed Oct. 16, 1928; Serial No. 384,242 filed Aug. 7, 1929 and Serial Nos. 390,851, 390,852, 390,853 filed Sept. 6, 1929.

I claim:

1. A coating composition comprising powdered mineral material, mineral fibrous material, calcined magnesite, and a finely-divided cellulose material pretreated with a volatile non-inflammable water-proofing material free from dissolved solid bodies, the said materials being mixed in a dry state and rendered plastic by a solution of magnesium chloride.

2. A coating composition comprising powdered mineral material, mineral fibrous material, calcined magnesite, and finely-divided cellulose material impregnated with a volatile non-imflammable water-proofing material free from dissolved solid bodies, the said materials being mixed in a dry state and rendered plastic by a solution of magnesium chloride.

3. A coating composition comprising powdered mineral material, mineral fibrous material, calcined magnesite, and sawdust impregnated with a volatile non-inflammable water-proofing material free from dissolved solid bodies which has been allowed to evaporate from the surface of the sawdust, the said materials being mixed together in a dry state and reduced to a plastic composition by a solution of magnesium chloride.

4. A coating composition comprising mineral material, calcined magnesite, finely-divided cellulose material impregnated with mono-chlor-naphthalene and evaporated from the surface thereof, and a solution of magnesium chloride.

5. A coating composition comprising mineral material, calcined magnesite, finely-divided cellulose material, each particle thereof being saturated interiorly with mono-chlor-naphthalene and substantially free exteriorly thereof, and a solution of magnesium chloride.

JOHN FELTER.